(12) United States Patent
Labrunie

(10) Patent No.: US 12,311,701 B2
(45) Date of Patent: May 27, 2025

(54) TIRE TREAD COMPRISING A CROSSLINKING SYSTEM BASED ON ORGANIC PEROXIDE

(71) Applicant: COMPAGNIE GENERALE DES ETABLISSEMENTS MICHELIN, Clermont-Ferrand (FR)

(72) Inventor: Philippe Labrunie, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 614 days.

(21) Appl. No.: 17/056,195

(22) PCT Filed: Apr. 25, 2019

(86) PCT No.: PCT/FR2019/050973
§ 371 (c)(1),
(2) Date: Nov. 17, 2020

(87) PCT Pub. No.: WO2019/220029
PCT Pub. Date: Nov. 21, 2019

(65) Prior Publication Data
US 2021/0213781 A1    Jul. 15, 2021

(30) Foreign Application Priority Data

May 17, 2018    (FR) ....................................... 1854130

(51) Int. Cl.
| | | |
|---|---|---|
| *B60C 1/00* | (2006.01) | |
| *C08C 19/25* | (2006.01) | |
| *C08K 3/04* | (2006.01) | |
| *C08K 3/36* | (2006.01) | |
| *C08K 5/14* | (2006.01) | |
| *C08K 5/5465* | (2006.01) | |
| *C08L 9/00* | (2006.01) | |

(52) U.S. Cl.
CPC .............. *B60C 1/0016* (2013.01); *C08K 3/04* (2013.01); *C08K 3/36* (2013.01); *C08K 5/14* (2013.01); *C08K 5/5465* (2013.01); *C08L 9/00* (2013.01)

(58) Field of Classification Search
CPC .......... C08C 19/25; C08K 5/14; B60C 1/0016
See application file for complete search history.

(56) References Cited

U.S. PATENT DOCUMENTS

| | | | |
|---|---|---|---|
| 3,954,880 A | 5/1976 | Nakayama et al. | |
| 5,409,969 A | 4/1995 | Hamada | |
| 5,977,238 A | 11/1999 | Labauze | |
| 6,013,718 A | 1/2000 | Cabioch et al. | |
| 6,071,995 A | 6/2000 | Labauze | |
| 6,774,255 B1 | 8/2004 | Tardivat et al. | |
| 6,849,754 B2 | 2/2005 | Deschler et al. | |
| 7,045,578 B2 | 5/2006 | Karato et al. | |
| 7,217,751 B2 | 5/2007 | Durel et al. | |
| 7,250,463 B2 | 7/2007 | Durel et al. | |
| 7,335,692 B2 | 2/2008 | Vasseur et al. | |
| 7,488,768 B2 | 2/2009 | Tardivat et al. | |
| 8,344,063 B2 | 1/2013 | Marechal et al. | |
| 8,492,475 B2 | 7/2013 | Araujo Da Silva et al. | |
| 8,492,479 B2 | 7/2013 | Robert et al. | |
| 8,927,643 B2 | 1/2015 | Favrot et al. | |
| 8,957,155 B2 | 2/2015 | Seeboth et al. | |
| 9,010,393 B2 | 4/2015 | Araujo Da Silva et al. | |
| 9,175,124 B2 | 11/2015 | Chaboche et al. | |
| 9,670,291 B2 | 6/2017 | Marechal et al. | |
| 9,822,247 B2 | 11/2017 | Abad | |
| 10,676,542 B2 | 6/2020 | Dire et al. | |
| 10,906,995 B2 | 2/2021 | Lee et al. | |
| 2004/0051210 A1 | 3/2004 | Tardivat et al. | |
| 2004/0092645 A1* | 5/2004 | Karato et al. | C08F 297/044 524/571 |
| 2004/0122157 A1 | 6/2004 | Labauze | |
| 2004/0127617 A1 | 7/2004 | Vasseur et al. | |
| 2004/0132880 A1 | 7/2004 | Durel et al. | |
| 2005/0004297 A1 | 1/2005 | Durel et al. | |

(Continued)

FOREIGN PATENT DOCUMENTS

| | | |
|---|---|---|
| CN | 105992798 A | 10/2016 |
| CN | 106414590 A | 2/2017 |

(Continued)

OTHER PUBLICATIONS

S. Brunauer, et al., "Adsorption of Gases in Multimolecular Layers", J. Am. Chem. Soc., vol. 60, pp. 309-319 (1938).
R. Mildenberg, et al., Hydrocarbon Resins, VCH, New York, chapter 5.5, pp. 141-146 (1997).

(Continued)

*Primary Examiner* — Vickey Nerangis
(74) *Attorney, Agent, or Firm* — VENABLE LLP

(57) ABSTRACT

A tire tread comprises a rubber composition based on at least from 50 to 100 phr of a first diene elastomer, the first diene elastomer being a polybutadiene-based elastomer, modified with a functional group capable of interacting with silica as reinforcing filler; optionally from 0 to 50 phr of a second diene elastomer; at least 20 phr of carbon black; less than 40 phr of silica as reinforcing filler; a coupling agent; a plasticizing system comprising a plasticizing resin exhibiting a glass transition temperature of greater than 20° C.; and a crosslinking system based on organic peroxide; the total content of the first diene elastomer and of the second diene elastomer in the composition being within a range extending from 80 to 100 phr.

15 Claims, No Drawings

(56) References Cited

U.S. PATENT DOCUMENTS

| | | |
|---|---|---|
| 2005/0049344 A1 | 3/2005 | Vasseur |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2010/0036018 A1 | 2/2010 | Jiang et al. |
| 2010/0145089 A1 | 6/2010 | Mignani et al. |
| 2010/0184912 A1 | 7/2010 | Marechal et al. |
| 2010/0249270 A1 | 9/2010 | Robert et al. |
| 2011/0152458 A1 | 6/2011 | Araujo Da Silva et al. |
| 2011/0178233 A1 | 7/2011 | Chaboche et al. |
| 2011/0294953 A1 | 12/2011 | Seeboth et al. |
| 2012/0252928 A1 | 10/2012 | Marechal et al. |
| 2013/0102714 A1 | 4/2013 | Recker et al. |
| 2013/0303685 A1 | 11/2013 | Favrot et al. |
| 2015/0343843 A1 | 12/2015 | Cato et al. |
| 2016/0176992 A1 | 6/2016 | Dire et al. |
| 2016/0319114 A1 | 11/2016 | Abad |
| 2016/0319116 A1 | 11/2016 | Labrunie et al. |
| 2017/0158782 A1 | 6/2017 | Fleury et al. |
| 2017/0204256 A1 | 7/2017 | Labrunie et al. |
| 2017/0204257 A1 | 7/2017 | Labrunie et al. |
| 2018/0223006 A1 | 8/2018 | Lee et al. |
| 2019/0077887 A1 | 3/2019 | Dire et al. |
| 2021/0079200 A1 | 3/2021 | Labrunie |
| 2021/0087370 A1 | 3/2021 | Labrunie |

FOREIGN PATENT DOCUMENTS

| | | |
|---|---|---|
| DE | 112013003160 T5 | 3/2015 |
| EP | 0778311 B1 | 6/1997 |
| EP | 0877047 B1 | 11/1998 |
| EP | 1380604 A1 | 1/2004 |
| EP | 1400559 A1 | 3/2004 |
| FR | 2967680 A1 | 5/2012 |
| FR | 3014443 A1 | 6/2015 |
| JP | 62-227908 A | 10/1987 |
| JP | 63-215701 A | 9/1988 |
| WO | 97/36724 A2 | 10/1997 |
| WO | 99/09036 A1 | 2/1999 |
| WO | 99/16600 A1 | 4/1999 |
| WO | 02/30939 A1 | 4/2002 |
| WO | 02/31041 A1 | 4/2002 |
| WO | 02/083782 A1 | 10/2002 |
| WO | 02/088238 A1 | 11/2002 |
| WO | 03/016387 A1 | 2/2003 |
| WO | 2006/023815 A2 | 3/2006 |
| WO | 2006/050486 A1 | 5/2006 |
| WO | 2006/125532 A1 | 11/2006 |
| WO | 2006/125533 A1 | 11/2006 |
| WO | 2006/125534 A1 | 11/2006 |
| WO | 2007/061550 A1 | 5/2007 |
| WO | 2007/098080 A2 | 8/2007 |
| WO | 2008/055986 A2 | 5/2008 |
| WO | 2008/141702 A1 | 11/2008 |
| WO | 2009/000750 A1 | 12/2008 |
| WO | 2009/133068 A1 | 11/2009 |
| WO | 2010/072685 A1 | 7/2010 |
| WO | 2011/042507 A1 | 4/2011 |
| WO | 2016/012258 A1 | 1/2016 |
| WO | 2017/060395 A1 | 4/2017 |
| WO | 2017/095563 A1 | 6/2017 |
| WO | 2017/191921 A1 | 11/2017 |
| WO | 2018/079803 A1 | 5/2018 |

OTHER PUBLICATIONS

International Search Report dated Aug. 29, 2019, in corresponding PCT/FR2019/050973 (4 pages).

* cited by examiner

TIRE TREAD COMPRISING A CROSSLINKING SYSTEM BASED ON ORGANIC PEROXIDE

BACKGROUND

The invention relates to tyre treads intended in particular for passenger vehicles.

Tyre treads have to comply with a large number of often conflicting technical requirements, including in particular the rolling resistance, the grip, the wear, the stiffness of the cured compositions (associated with road behaviour and with driving comfort), at the same time as the curing properties and the viscosity of the compositions in the raw state (associated with the ease of industrial processing of the compositions, or processability).

Thus, tyre designers are constantly looking for solutions which make it possible to change the existing compromise in properties by improving at least one property of the tyre, without, however, penalizing the others.

In order to improve the wet grip and dry grip compromise, there was provided, in Application WO 2017/095563, a composition comprising a peroxide-based crosslinking system in an elastomeric matrix comprising from 80 to 100 phr of an elastomer based on functionalized polybutadiene comprising from 8% to 15% by weight of vinyl units and at least 30% by weight of trans bond, and the glass transition temperature of which is between −100° C. and −80° C.

In point of fact, it still remains advantageous to further improve the wet grip and the dry grip.

On continuing its research studies, the Applicant Company has discovered, surprisingly, that a specific composition makes it possible to meet these needs. The Applicant Company has furthermore noted that this composition also makes it possible to improve the resistance to severe wear of treads comprising this composition.

SUMMARY

Thus, a subject-matter of the present invention is in particular a tyre tread comprising a rubber composition based on at least:
- from 50 to 100 phr of a first diene elastomer, the first diene elastomer being a polybutadiene-based elastomer, modified with a functional group capable of interacting with silica as reinforcing filler,
- optionally from 0 to 50 phr of a second diene elastomer which is different from the first diene elastomer,
- at least 20 phr of carbon black,
- less than 40 phr of silica as reinforcing filler,
- a coupling agent,
- a plasticizing system comprising a plasticizing resin exhibiting a glass transition temperature of greater than 20° C.,
- a crosslinking system based on organic peroxide, the total content of the first diene elastomer and of the second diene elastomer in the composition being within a range extending from 80 to 100 phr.

Another subject-matter of the present invention is a tyre provided with a tread according to the invention.

DETAILED DESCRIPTION

The invention and its advantages will be easily understood in the light of the description and implementational examples which follow.

I—DEFINITIONS

The expression "part by weight per hundred parts by weight of elastomer" (or phr) should be understood as meaning, within the meaning of the present invention, the part by weight per hundred parts by weight of elastomers, whether or not they are thermoplastic. In other words, the thermoplastic elastomers are elastomers.

In the present document, unless expressly indicated otherwise, all the percentages (%) shown are percentages (%) by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). In the present document, when an interval of values is denoted by the expression "from a to b", the interval represented by the expression "between a and b" is also and preferentially denoted.

In the present document, the expression composition "based on" is understood to mean a composition comprising the mixture and/or the reaction product of the various constituents used, some of these constituents being able to react and/or being intended to react with one another, at least partially, during the various phases of manufacture of the composition.

When reference is made to a "predominant" compound, this is understood to mean, within the meaning of the present invention, that this compound is predominant among the compounds of the same type in the composition, that is to say that it is the one which represents the greatest amount by weight among the compounds of the same type, for example more than 50%, 60%, 70%, 80%, 90%, indeed even 100%, by weight, with respect to the total weight of the compound type. Thus, for example, a predominant reinforcing filler is the reinforcing filler representing the greatest weight with respect to the total weight of the reinforcing fillers in the composition.

In the context of the invention, the carbon-comprising compounds mentioned in the description can be of fossil origin or biosourced. In the latter case, they can partially or completely result from biomass or be obtained from renewable starting materials resulting from biomass. Polymers, plasticizers, fillers and the like are concerned in particular.

All the values for glass transition temperature "Tg" described in the present document are measured in a known way by DSC (Differential Scanning Calorimetry) according to Standard ASTM D3418 (1999).

II—DESCRIPTION OF THE INVENTION

II-1 Elastomeric Matrix

According to the invention, the composition of the tread of the tyre comprises at least from 50 to 100 phr of a first diene elastomer, the first diene elastomer being a polybutadiene-based elastomer, modified with a functional group capable of interacting with silica as reinforcing filler, and optionally from 0 to 50 phr of a second diene elastomer, it being understood that the total content of the first diene elastomer and of the second diene elastomer in the composition being within a range extending from 80 to 100 phr.

II-1.1 First Diene Elastomer

In the present document, unless otherwise indicated, when the expression "first diene elastomer" is used, reference is being made to a polybutadiene-based elastomer, modified with a functional group capable of interacting with silica as reinforcing filler. Such elastomers and the process for obtaining them are described in particular in the patent documents U.S. Pat. No. 5,977,238, WO 2009/133068, EP 0 778 311 B1, WO 2008/141702, WO 2006/050486, EP 0877 047 B1, EP 1 400 559 B1, JP 63-215701, JP 62-227908 or U.S. Pat. No. 5,409,969. The first diene elastomer can also be a mixture of two, indeed even more, polybutadiene-based elastomers, modified with a functional group capable of interacting with silica as reinforcing filler. By the term "polybutadiene-based elastomer", a person skilled in the art clearly understands that this is an elastomer comprising at least several butadiene units. This elastomer may comprise only butadiene units or else also comprise units other than butadiene units, for example styrene units.

Advantageously, the functional group capable of interacting with silica as reinforcing filler of the first diene elastomer is at least one (that is to say one or more) alkoxysilane group bonded to the elastomer by its silicon atom. In the present patent application, the term "the alkoxysilane group" is used to denote at least, that is to say one or more, alkoxysilane group bonded to the elastomer by its silicon atom.

According to the invention, the alkoxysilane group of the first diene elastomer can be located at the end of the elastomer chain.

Alternatively, and advantageously, the alkoxysilane group is located inside (or "in") the elastomer chain; it will then be said that the first diene elastomer is coupled (or also functionalized) in the middle of the chain, in contrast to the position "at the chain end", this being the case although the grouping is not located precisely in the middle (or "at the centre") of the elastomer chain. The silicon atom of this functional group connects the two main branches of the elastomer chain of the first diene elastomer.

The alkoxysilane group can bear another functional group preferably borne by the silicon of the alkoxysilane group, directly (that is to say, via a covalent bond) or via a spacer group defined as being an atom or a linear or branched divalent aliphatic $C_1$-$C_{18}$ hydrocarbon radical which is saturated or unsaturated and cyclic or non-cyclic, or a divalent aromatic $C_6$-$C_{18}$ hydrocarbon radical.

The other functional group is preferably a functional group comprising at least one heteroatom chosen from N, S, O or P. Mention may be made, by way of example, among these functional groups, of primary, secondary or tertiary and cyclic or non-cyclic amines, isocyanates, imines, cyanos, thiols, carboxylates, epoxides or primary, secondary or tertiary phosphines.

Mention may thus be made, as secondary or tertiary amine functional group, of amines substituted by $C_1$-$C_{10}$ alkyl, preferably $C_1$-$C_4$ alkyl, radicals, more preferentially a methyl or ethyl radical, or else of cyclic amines forming a heterocycle containing a nitrogen atom and at least one carbon atom, preferably from 2 to 6 carbon atoms. For example, the methylamino-, dimethylamino-, ethylamino-, diethylamino-, propylamino-, dipropylamino-, butylamino-, dibutylamino-, pentylamino-, dipentylamino-, hexylamino-, dihexylamino- or hexamethyleneamino-groups, preferably the diethylamino- and dimethylamino-groups, are suitable.

Mention may be made, as imine functional group, of ketimines. For example, the (1,3-dimethylbutylidene)amino-, (ethylidene)amino-, (1-methylpropylidene)amino-, (4-N,N-dimethylaminobenzylidene)amino-, (cyclohexylidene)amino-, dihydroimidazole and imidazole groups are suitable.

Mention may thus be made, as carboxylate functional group, of acrylates or methacrylates. Such a functional group is preferably a methacrylate.

Mention may be made, as epoxide functional group, of the epoxy or glycidyloxy groups.

Mention may be made, as secondary or tertiary phosphine functional group, of phosphines substituted by $C_1$-$C_{10}$ alkyl, preferably $C_1$-$C_4$ alkyl, radicals, more preferentially a methyl or ethyl radical, or else diphenylphosphine. For example, the methylphosphino-, dimethylphosphino-, ethylphosphino-, diethylphosphino, ethylmethylphosphino- and diphenylphosphino-groups are suitable.

Particularly advantageously, the alkoxysilane group bears an amine functional group. In this case, the alkoxysilane group can also be denoted "alkoxysilane group bearing an amine functional group" or "amino-alkoxysilane group", the two expressions having the same meaning. The amine functional group can be a primary, secondary or tertiary amine functional group. Preferentially, the amine functional group is a tertiary amine functional group, preferably chosen from diethylamine and dimethylamine.

The primary, secondary or tertiary amine functional group can be borne directly (via a covalent bond) by the silicon atom of the alkoxysilane group of the first diene elastomer, or via a spacer group. The spacer group can in particular be a linear or branched divalent $C_{1-10}$ alkyl, $C_{6-18}$ aryl or $C_{7-18}$ aralkyl hydrocarbon radical. Preferably, the spacer group is a linear $C_{2-3}$ hydrocarbon radical.

According to the invention, the alkoxysilane group bearing the primary, secondary or tertiary amine functional group can correspond to one of the following formulae (I) to (III):

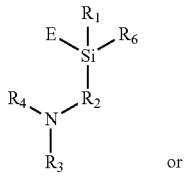

Formula (I)

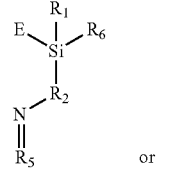

Formula (II)

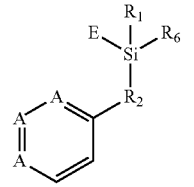

Formula (III)

in which:
E denotes the first diene elastomer,
$R_1$ and $R_6$, which are identical or different, denote the first diene elastomer or an oxygen atom substituted by a hydrogen atom or a linear or branched $C_{1-10}$ alkyl, $C_{5-18}$ cycloalkyl, $C_{6-18}$ aryl or $C_{7-18}$ aralkyl radical;
$R_2$ is a linear or branched divalent $C_{1-10}$ alkyl, $C_{6-18}$ aryl or $C_{7-18}$ aralkyl hydrocarbon radical;

$R_3$ and $R_4$, which are identical or different, represent a hydrogen atom or a $C_{1-10}$ alkyl radical, provided that, when one of $R_3$ and $R_4$ represents a hydrogen atom, the other is different, or else $R_3$ and $R_4$ form, with N to which they are bonded, a heterocycle containing a nitrogen atom and at least one carbon atom;

$R_5$ represents a linear or branched $C_{1-10}$ alkylidene radical;

the symbols A denote, independently of one another, a nitrogen atom or a carbon atom, provided that at least one of the symbols A denotes a nitrogen atom.

Advantageously, the alkoxysilane group bearing the primary, secondary or tertiary amine functional group corresponds to one of the above formulae (I) to (III) in which:

$R_1$ represents an oxygen atom substituted by a methyl or ethyl radical; and/or $R_2$ represents the ethane-1,2-diyl or propane-1,3-diyl radical; and/or $R_3$ and $R_4$, which are identical or different, represent a methyl or ethyl radical; and/or $R_5$ represents a linear or branched $C_{4-6}$ alkylidene radical; and/or just one A denotes a nitrogen atom and is located in the meta or para position of the ring with respect to $-R_2$; and/or $R_6$ denotes the first diene elastomer.

The first diene elastomer bearing an amino-alkoxysilane group bonded to the diene elastomer by the silicon atom as defined in the present document can be prepared by techniques known to a person skilled in the art, for example according to an appropriate process described in Application WO 2009/133068 or Application WO 2017/060395.

The process for the preparation of the first diene elastomer bearing an amino-alkoxysilane group bonded to the diene elastomer by the silicon atom as defined in the present document can in particular comprise a stripping stage in order to recover the elastomer in the dry form. This stripping stage can have the effect of hydrolysing all or a portion of the hydrolysable alkoxysilane functional groups of said copolymer in order to convert them into silanol functional groups. For example, at least 50 mol % of the functional groups can thus be hydrolysed.

Thus, according to the invention, the alkoxysilane group of the first diene elastomer bearing an amino-alkoxysilane group bonded to the diene elastomer by the silicon atom as defined in the present document can be partially or completely hydrolysed to give silanol.

According to the invention, the functional group capable of interacting with silica as reinforcing filler of the first diene elastomer can also be at least one SiOR functional group, R being hydrogen or a hydrocarbon radical, in particular an alkyl, preferentially having from 1 to 12 carbon atoms, in particular methyl or ethyl. In the present patent application, the term "the SiOR functional group" is used to denote at least one SiOR functional group, that is to say one or more SiOR functional groups.

Hydrocarbon radical is understood to mean a monovalent group essentially formed of carbon and hydrogen atoms, it being possible for such a group to comprise at least one heteroatom, it being known that the assembly formed by the carbon and hydrogen atoms represents the predominant numerical fraction in the hydrocarbon radical.

The hydrocarbon radical can be a linear or branched or also cyclic alkyl having from 1 to 12 carbon atoms, more preferentially from 1 to 6 carbon atoms, more preferentially still from 1 to 4 carbon atoms, in particular a methyl or an ethyl. The radical R can also be an alkoxyalkyl, more particularly having from 2 to 8 carbon atoms.

The SiOR functional group borne by the first diene elastomer can be located along the elastomer chain as a pendent group, at one end of the elastomer chain or else actually inside the elastomer chain. In the case where there are several SiOR functional groups borne by the elastomer, they can occupy one or other of the above configurations.

Advantageously, the radical R of the SiOR functional group borne by the first diene elastomer is a hydrogen atom ("silanol" functional group of formula SiOH). The silanol SiOH functional group is preferentially located at the end of the chain of the diene elastomer, in particular in the form of a dimethylsilanol—$SiMe_2SiOH$ group.

The silanol functional group can be bonded to a polysiloxane which constitutes one of the blocks of a block copolymer also comprising a polydiene block, as described, for example, in Patent EP 0 778 311 B1. It can also be bonded to a polyether constituting one of the blocks of a block copolymer also comprising a polydiene block, as described, for example, in Application WO 2009/000750.

Whatever the functional group capable of interacting with silica as reinforcing filler of the first diene elastomer, the first diene elastomer can also exhibit additional star-branching by reaction with a star-branching agent known per se, for example based on tin or on silicon. Preferably, the copolymer based on styrene and on butadiene is functionalized with tin (Sn), that is to say that they comprise a C—Sn bond (also referred to as Sn functionalization). They can be functionalized singly (C—Sn bond at the chain end), coupled (Sn atom between two chains) and/or star-branched (Sn atom between 3 or more chains) with a functionalization, coupling and/or star-branching agent. Generically, in order to bring together all these elastomers bonded to tin, the term "tin-functionalized elastomers" is used. These elastomers are known to a person skilled in the art, for example those described in Application WO 2011/042507.

Particularly advantageously, the first diene elastomer is a copolymer based on styrene and on butadiene.

Within the meaning of the present invention, copolymer based on styrene and on butadiene refers to any copolymer obtained by copolymerization of one or more styrene compounds with one or more butadiene(s). The following are suitable in particular as styrene monomers: styrene, methylstyrenes, para-(tert-butyl)styrene, methoxystyrenes or chlorostyrenes. The following are suitable in particular as butadiene monomers: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, and an aryl-1,3-butadiene. These elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers.

According to the invention, the first diene elastomer is advantageously a styrene/butadiene copolymer (SBR).

Preferentially, the copolymer based on styrene and on butadiene is formed of styrene monomers and of butadiene monomers, that is to say that the sum of the molar percentages of styrene monomers and of butadiene monomers is equal to 100%.

It should be noted that the SBR can be prepared in emulsion (ESBR) or in solution (SSBR). Whether it is ESBR or SSBR, the SBR can have any microstructure. It is possible in particular to use an SBR having a low styrene content, for example of from more than 0% to 10%, a mean styrene content, for example, of between 10% and 35% by weight, or a high styrene content, for example from 35% to 55%, a content of vinyl bonds of the butadiene part of between 4% and 70%, and a Tg of less than −40° C., preferably less than −50° C.

Preferably, the first diene elastomer is a styrene/butadiene copolymer which exhibits any one, advantageously the combination of two or three, more advantageously still all, of the following characteristics:
- it is a styrene/butadiene copolymer prepared in solution (SSBR),
- its content by weight of styrene, with respect to the total weight of the styrene/butadiene copolymer, is between 1% and 15%, preferably between 1% and 4%,
- its content of vinyl bonds of the butadiene part is between 4% and 25%, preferably between 10% and 15%,
- its Tg is less than −60° C., preferably between −100° C. and −80° C.

Advantageously, the content of the first diene elastomer in the composition of the tread of the tyre according to the invention is within a range extending from 80 to 100 phr. It can, for example, be from 80 to 95 phr, for example from 80 to 90 phr.

II-1.2 Second Diene Elastomer

Although this is not necessary for the implementation of the present invention, the elastomeric matrix of the composition of the tread according to the invention can contain in a minor way one or more diene elastomers (hereinafter known as "second diene elastomer", for the sake of simplicity of wording) different from the first diene elastomer which is used in the context of the present invention. For example, the second diene elastomer can be chosen, for example, from the group of highly unsaturated diene elastomers consisting of polybutadienes (abbreviated to "BRs") different from the first diene elastomer used in the context of the present invention, natural rubber (NR), synthetic polyisoprene (IR), butadiene copolymers, isoprene copolymers (other than IIRs) and the mixtures of these elastomers. Such copolymers can, for example, be selected from the group consisting of butadiene/styrene copolymers (SBRs) different from the first diene elastomer which is used in the context of the present invention, isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these compounds. Advantageously, the second diene elastomer is a polybutadiene. Also advantageously, the second diene elastomer is natural rubber, a synthetic polyisoprene or mixtures thereof, preferably natural rubber.

Advantageously, the content of the second diene elastomer in the composition of the tread of the tyre according to the invention is within a range extending from 0 to 20 phr. It can, for example, be from 5 to 20 phr, for example from 10 to 20 phr.

The elastomeric matrix can also contain in a minor way any type of synthetic elastomer other than a diene elastomer, indeed even with polymers other than elastomers, for example thermoplastic polymers. Preferably, the elastomeric matrix does not contain a synthetic elastomer other than a diene elastomer or a polymer other than elastomers or contains less than 10 phr, preferably less than 5 phr, thereof.

Particularly advantageously, the composition of the tread according to the invention does not comprise butyl rubber or comprises less than 10 phr, preferably less than 5 phr, thereof.

Preferably, the content of the first diene elastomer in the composition is within a range extending from 80 to 100 phr, and the content of the second diene elastomer in the composition is within a range extending from 0 to 20 phr.

Advantageously, the total content of the first diene elastomer and of the second diene elastomer in the composition of the tread of the tyre according to the invention is within a range extending from 80 to 100 phr, preferably from 90 to 100 phr, more preferably from 95 to 100 phr.

Particularly advantageously, the total content of the first diene elastomer and of the second diene elastomer in the composition of the tread of the tyre according to the invention is 100 phr.

II-2 Reinforcing Filler

The composition of the tread according to the invention has the essential characteristic of containing at least 20 phr of carbon black and less than 40 phr of silica as reinforcing filler.

The blacks which can be used in the context of the present invention can be any black conventionally used in tyres or their treads ("tyre-grade" blacks). Among the latter, mention will more particularly be made of the reinforcing carbon blacks of the 100, 200 and 300 series, or the blacks of the 500, 600 or 700 series (ASTM grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, Applications WO 97/36724 or WO 99/16600). The BET specific surface of the carbon blacks is measured according to Standard D6556-10 [multipoint (a minimum of 5 points) method—gas: nitrogen—relative pressure $p/p_0$ range: 0.1 to 0.3].

Preferably, the carbon black has a BET specific surface in a range extending from 70 to 180 m$^2$/g, preferably from 100 to 150 m$^2$/g. The BET specific surface of the carbon blacks is measured according to Standard D6556-10 [multipoint (a minimum of 5 points) method—gas: nitrogen—relative pressure $p/p_0$ range: 0.1 to 0.3].

More preferably, the carbon black has a COAN oil absorption number in a range extending from 85 to 120 ml/100 g. The COAN (Compressed Oil Absorption Number) of the carbon blacks is measured according to Standard ASTM D3493-16.

"Silica as reinforcing filler" should be understood here as meaning silica (SiO$_2$), capable of reinforcing by itself alone, without means other than an intermediate coupling agent, a rubber composition intended for the manufacture of pneumatic tyres; such a filler is generally characterized, in a known way, by the presence of hydroxyl (—OH) groups at its surface.

The silica used can be any reinforcing silica known to a person skilled in the art, in particular any precipitated or fumed silica exhibiting a BET specific surface and also a CTAB specific surface both of less than 450 m$^2$/g, preferably from 30 to 400 m$^2$/g, in particular between 60 and 300 m$^2$/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16387. The BET specific surface of the silica is determined in a known way by gas adsorption using the Brunauer-Emmett-Teller method described in The Journal of the American Chemical Society, Vol. 60, page 309, February 1938, more specifically according to French Standard NF ISO 9277 of December 1996 (multipoint (5 point) volumetric method—gas: nitrogen—degassing: 1 hour at 160° C.—relative pressure $p/p_0$ range: 0.05 to 0.17). The CTAB specific surface of the silica is determined according to French Standard NF T 45-007 of November 1987 (method B).

Preferably, the content of carbon black in the composition of the tread is between 20 and 200 phr, preferably between 80 and 170 phr.

Preferably, the content of silica in the composition of the tread is between 0 and 39 phr, preferably between 5 and 30 phr.

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional.

A person skilled in the art can find coupling agent examples in the following documents: WO 02/083782, WO 02/30939, WO 02/31041, WO 2007/061550, WO 2006/125532, WO 2006/125533, WO 2006/125534, U.S. Pat. No. 6,849,754, WO 99/09036, WO 2006/023815, WO 2007/098080, WO 2010/072685 and WO 2008/055986.

The coupling agent can in particular be an organosilane coupling agent not having a sulfur atom, having a disulfide, trisulfide or tetrasulfide group, or having a mercapto group. For example, the coupling agent can be selected from the group comprising or consisting of 3,3'-bis(triethoxysilylpropyl) disulfide, 3,3'-bis(tri(t-butoxy)silylpropyl) disulfide, 3,3'-bis(propyldiethoxysilylpropyl) disulfide, 2,2'-bis(dimethylmethoxysilylethyl) disulfide and their mixtures. The coupling agent can also be selected from the group consisting of or comprising 3-mercaptopropyltrimethoxysilane, 2-mercaptoethyltrimethoxysilane, 2-mercaptodimethylmethoxysilane and their mixtures. It can also be selected from the group consisting of or comprising (3-glycidoxypropyl)methyldimethoxysilane, vinyltrimethoxysilane, (3-methacryloxypropyl)methyldimethoxysilane and their mixtures.

The content of coupling agent advantageously represents from 0.5% to 15% by weight, with respect to the amount of reinforcing inorganic filler, preferably from 4% to 12%, more preferably from 6% to 10%, by weight, with respect to the amount of reinforcing inorganic filler. Typically, the content of coupling agent is less than 6 phr, preferentially within a range extending from 0.5 to 5 phr, preferably from 0.5 to 4 phr. This content can easily be adjusted by a person skilled in the art according to the content of inorganic filler used in the composition.

The rubber composition of the tyre according to the invention can also comprise, in addition to the coupling agents, coupling activators, agents for covering the inorganic fillers or more generally processing aids capable, in a known way, by virtue of an improvement in the dispersion of the filler in the rubber matrix and of a lowering in the viscosity of the compositions, of improving their ease of processing in the raw state, these processing aids being, for example, hydrolysable silanes, such as alkylalkoxysilanes (in particular alkyltriethoxysilanes), polyols, polyethers (for example, polyethylene glycols), primary, secondary or tertiary amines (for example, trialkanolamines), hydroxylated or hydrolysable POSs, for example $\alpha,\omega$-dihydroxypolyorganosiloxanes (in particular $\alpha,\omega$-dihydroxypolydimethylsiloxanes), or fatty acids, such as, for example, stearic acid.

Particularly advantageously, the total content of reinforcing filler is between 80 and 200 phr, preferably between 100 and 190 phr.

II-3 Plasticizing System

The rubber composition of the tread of the tyre according to the invention additionally comprises a plasticizing system comprising a plasticizing resin exhibiting a glass transition temperature of greater than 20° C., known as "high Tg" (also denoted "plasticizing resin" in the present document for the sake of simplicity of wording).

II-3.1 Plasticizing Resin

The designation "resin" is reserved, in the present patent application, by definition known to a person skilled in the art, for a compound which is solid at ambient temperature (23° C.), in contrast to a liquid plasticizing compound, such as an oil.

Plasticizing resins are polymers well known to a person skilled in the art, essentially based on carbon and hydrogen but which can comprise other types of atoms, which can be used in particular as plasticizing agents or tackifying agents in polymer matrices. They are generally by nature miscible (i.e., compatible) at the contents used with the polymer compositions for which they are intended, so as to act as true diluents. They have been described, for example, in the work entitled "*Hydrocarbon Resins*" by R. Mildenberg, M. Zander and G. Collin (New York, V C H, 1997, ISBN 3-527-28617-9), Chapter 5 of which is devoted to their applications, notably in the tyre rubber field (5.5. "*Rubber Tires and Mechanical Goods*"). They can be aliphatic, cycloaliphatic, aromatic, hydrogenated aromatic, of the aliphatic/aromatic type, that is to say based on aliphatic and/or aromatic monomers. They can be natural or synthetic, based or not based on petroleum (if such is the case, also known under the name of petroleum resins). Their Tg is preferably greater than 20° C. (generally between 30° C. and 95° C.).

In a known way, these plasticizing resins can also be described as thermoplastic resins in the sense that they soften when heated and can thus be moulded. They can also be defined by a softening point. The softening point of a plasticizing resin is generally greater by approximately 50° C. to 60° C. than its Tg value. The softening point is measured according to Standard ISO 4625 ("Ring and Ball" method). The macrostructure (Mw, Mn and PI) is determined by size exclusion chromatography (SEC) as indicated below.

As a reminder, the SEC analysis, for example, consists in separating the macromolecules in solution according to their size through columns filled with a porous gel; the molecules are separated according to their hydrodynamic volume, the bulkiest being eluted first. The sample to be analysed is simply dissolved beforehand in an appropriate solvent, tetrahydrofuran, at a concentration of 1 g/litre. The solution is then filtered through a filter with a porosity of 0.45 μm, before injection into the apparatus. The apparatus used is, for example, a Waters Alliance chromatographic line according to the following conditions:

elution solvent tetrahydrofuran;
temperature 35° C.;
concentration 1 g/litre;

flow rate: 1 ml/min;
injected volume: 100 μl;
Moore calibration with polystyrene standards;
set of 3 Waters columns in series (Styragel HR4E, Styragel HR1 and Styragel HR 0.5);
detection by differential refractometer (for example, Waters 2410) which can be equipped with operating software (for example, Waters Millennium).

A Moore calibration is carried out with a series of commercial polystyrene standards having a low PI (less than 1.2), with known molar masses, covering the range of masses to be analysed. The weight-average molar mass (Mw), the number-average molar mass (Mn) and the polydispersity index (PI=Mw/Mn) are deduced from the data recorded (curve of distribution by mass of the molar masses).

All the values for molar masses shown in the present patent application are thus relative to calibration curves produced with polystyrene standards.

According to a preferential embodiment of the invention, the plasticizing resin exhibits at least any one, preferably 2 or 3, more preferentially all, of the following characteristics:
- a Tg of greater than 25° C. (in particular of between 30° C. and 100° C.), more preferentially of greater than 30° C. (in particular of between 30° C. and 95° C.);
- a softening point of greater than 50° C. (in particular of between 50° C. and 150° C.);
- a number-average molar mass (Mn) of between 300 and 2000 g/mol, preferentially between 400 and 1500 g/mol;
- a polydispersity index (PI) of less than 3, preferentially of less than 2 (as a reminder: PI=Mw/Mn with Mw the weight-average molar mass).

The preferential high Tg plasticizing resins above are well known to a person skilled in the art and are commercially available, for example sold as regards:
- polylimonene resins: by DRT under the name Dercolyte L120 (Mn=625 g/mol; Mw=1010 g/mol; PI=1.6; Tg=72° C.) or by Arizona under the name Sylvagum TR7125C (Mn=630 g/mol; Mw=950 g/mol; PI=1.5; Tg=70° C.);
- $C_5$ fraction/vinylaromatic copolymer resins, in particular $C_5$ fraction/styrene or $C_5$ fraction/$C_9$ fraction copolymer resins: by Neville Chemical Company under the names Super Nevtac 78, Super Nevtac 85 or Super Nevtac 99, by Goodyear Chemicals under the name Wingtack Extra, by Kolon under the names Hikorez T1095 and Hikorez T 1100 or by Exxon under the names Escorez 2101 and Escorez 1273;
- limonene/styrene copolymer resins: by DRT under the name Dercolyte TS 105 from DRT or by Arizona Chemical Company under the names ZT115LT and ZT5100.

According to the invention, the plasticizing resin exhibiting a glass transition temperature of greater than 20° C. can be selected from the group comprising or consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, α-methylstyrene homopolymer or copolymer resins and their mixtures. Preferably, the plasticizing resin is selected from the group comprising or consisting of (D)CPD/vinylaromatic copolymer resins, (D)CPD/terpene copolymer resins, terpene/phenol copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinylaromatic copolymer resins and their mixtures.

The term "terpene" groups together here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Suitable as vinylaromatic monomers are, for example: styrene, α-methylstyrene, ortho-methylstyrene, meta-methylstyrene, para-methylstyrene, vinyltoluene, para-(tert-butyl)styrene, methoxystyrenes, chlorostyrenes, hydroxystyrenes, vinylmesitylene, divinylbenzene, vinylnaphthalene or any vinylaromatic monomer resulting from a $C_9$ fraction (or more generally from a $C_8$ to $C_{10}$ fraction).

More particularly, mention may be made of the plasticizing resins selected from the group consisting of (D)CPD homopolymer resins, (D)CPD/styrene copolymer resins, polylimonene resins, limonene/styrene copolymer resins, limonene/D(CPD) copolymer resins, $C_5$ fraction/styrene copolymer resins, $C_5$ fraction/$C_9$ fraction copolymer resins and the mixtures of these resins.

All the above plasticizing resins are well known to a person skilled in the art and are commercially available, for example sold by DRT under the name Dercolyte as regards polylimonene resins, sold by Neville Chemical Company under the name Super Nevtac, by Kolon under the name Hikorez or by Exxon Mobil under the name Escorez as regards $C_5$ fraction/styrene resins or $C_5$ fraction/$C_9$ fraction resins, or else by Struktol under the name 40 MS or 40 NS (mixtures of aromatic and/or aliphatic resins).

Advantageously, the content of plasticizing resin exhibiting a glass transition temperature of greater than 20° C. in the composition of the tread according to the invention is within a range extending from 15 to 200 phr, preferably from 30 to 180 phr, more preferably from 40 to 160 phr.

II-3.2 Plasticizer Liquid at 23° C.

Although this is not necessary for the implementation of the present invention, the plasticizing system of the rubber composition of the tread of the tyre according to the invention can comprise a plasticizer liquid at 23° C., called "low Tg", that is to say which by definition exhibits a Tg of less than −20° C., preferably of less than −40° C. According to the invention, the composition can optionally comprise from 0 to 110 phr of a plasticizer liquid at 23° C.

When a plasticizer liquid at 23° C. is used, its content in the composition of the tread according to the invention can be within a range extending from 5 to 110 phr, preferably from 15 to 90 phr.

Any plasticizer liquid at 23° C. (or extender oil), whether of aromatic or non-aromatic nature, known for its plasticizing properties with regard to diene elastomers can be used. At ambient temperature (23° C.), these plasticizers or these oils, which are more or less viscous, are liquids (that is to say, as a reminder, substances which have the ability to eventually take on the shape of their container), as opposed, in particular, to plasticizing resins, which are by nature solids at ambient temperature.

Plasticizers liquid at 23° C. selected from the group comprising or consisting of liquid diene polymers, polyolefin oils, naphthenic oils, paraffinic oils, DAE oils, MES (Medium Extracted Solvates) oils, TDAE (Treated Distillate Aromatic Extracts) oils, RAE (Residual Aromatic Extracts) oils, TRAB (Treated Residual Aromatic Extracts) oils, SRAE (Safety Residual Aromatic Extracts) oils, mineral oils, vegetable oils, ether plasticizers, ester plasticizers, phosphate plasticizers, sulfonate plasticizers and the mixtures of these plasticizers liquid at 23° C. are particularly suitable.

For example, the plasticizer liquid at 23° C. can be a petroleum oil, which is preferably non-aromatic. A liquid plasticizer is described as non-aromatic when it exhibits a content of polycyclic aromatic compounds, determined with the extract in DMSO according to the IP 346 method, of less than 3% by weight, with respect to the total weight of the plasticizer.

The plasticizer liquid at 23° C. can also be a liquid polymer resulting from the polymerization of olefins or of dienes, such as polybutenes, polydienes, in particular polybutadienes, polyisoprenes (also known under the name LIRs) or copolymers of butadiene and of isoprene, or also copolymers of butadiene or of isoprene and of styrene, or the mixtures of these liquid polymers. The number-average molar mass of such liquid polymers is preferentially within a range extending from 500 g/mol to 50 000 g/mol, preferentially from 1000 g/mol to 10 000 g/mol. Mention may be made, by way of example, of the Ricon products from Sartomer.

When the plasticizer liquid at 23° C. is a vegetable oil, it can, for example, be an oil selected from the group comprising or consisting of linseed oil, safflower oil, soybean oil, maize oil, cottonseed oil, rapeseed oil, castor oil, tung oil, pine oil, sunflower oil, palm oil, olive oil, coconut oil, peanut oil, grapeseed oil and the mixtures of these oils. The vegetable oil is preferentially rich in oleic acid, that is to say that the fatty acid (or the combined fatty acids, if several are present) from which it derives comprises oleic acid according to a fraction by weight at least equal to 60%, more preferentially still according to a fraction by weight at least equal to 70%. Use is advantageously made, as vegetable oil, of a sunflower oil which is such that the combined fatty acids from which it derives comprise oleic acid according to a fraction by weight equal to or greater than 60%, preferably 70%, and, according to a particularly advantageous embodiment of the invention, according to a fraction by weight equal to or greater than 80%. According to another specific embodiment of the invention, the liquid plasticizer is a triester selected from the group consisting of carboxylic acid triesters, phosphoric acid triesters, sulfonic acid triesters and the mixtures of these triesters.

Mention may be made, as examples of phosphate plasticizers, of those which comprise between 12 and 30 carbon atoms, for example trioctyl phosphate. Mention may in particular be made, as examples of carboxylic acid ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may in particular be made, among the above triesters, of glycerol triesters, preferably predominantly composed (for more than 50%, more prefentially for more than 80%, by weight) of an unsaturated $C_{18}$ fatty acid, that is to say selected from the group consisting of oleic acid, linoleic acid, linolenic acid and the mixtures of these acids. The glycerol triester is preferred. More preferentially, whether it is of synthetic origin or natural origin (case, for example, of sunflower or rapeseed vegetable oils), the fatty acid used is composed for more than 50% by weight, more preferentially still for more than 80% by weight, of oleic acid. Such triesters (trioleates) having a high content of oleic acid are well known; they have been described, for example, in Application WO 02/088238 as plasticizing agents in tyre treads.

When the plasticizer liquid at 23° C. is an ether plasticizer, it can, for example, be polyethylene glycol or polypropylene glycol.

Preferably, the plasticizer liquid at 23° C. is selected from the group comprising or consisting of MES oils, TDAE oils, naphthenic oils, vegetable oils and the mixtures of these the mixtures of these plasticizers liquid at 23° C. More preferably, the plasticizer liquid at 23° C. is a vegetable oil, preferably a sunflower oil.

II-3.3 Plasticizing Resin Viscous at 20° C.

Although this is not necessary for the implementation of the present invention, the plasticizing system of the rubber composition of the tread of the tyre according to the invention can comprise a plasticizing resin viscous at 20° C., called "low Tg", that is to say which by definition exhibits a Tg within a range extending from −40° C. to −20° C. According to the invention, the composition can optionally comprise, in addition to or as replacement for all or part of the plasticizer liquid at 23° C., from 0 to 110 phr of plasticizing resin viscous at 20° C.

Preferably, the plasticizing resin viscous at 20° C. exhibits at least any one, preferably 2 or 3, preferably all, of the following characteristics:
  a Tg of between −40° C. and 0° C., more preferentially between −30° C. and 0° C. and more preferentially still between −20° C. and 0° C.;
  a number-average molecular weight (Mn) of less than 800 g/mol, preferably of less than 600 g/mol and more preferentially of less than 400 g/mol;
  a softening point within a range extending from 0° C. to 50° C., preferentially from 0° C. to 40° C., more preferentially from 10° C. to 40° C., preferably from 10° C. to 30° C.;
  a polydispersity index (PI) of less than 3, more preferentially of less than 2 (as a reminder: PI=Mw/Mn with Mw the weight-average molecular weight).

The above preferential plasticizing resins viscous at 20° C. are well known to a person skilled in the art and are commercially available, for example sold as regards:
  aliphatic resin: by Cray Valley under the name Wingtack 10 (Mn=480 g/mol; Mw=595 g/mol; PI=1.2; SP=10° C.; Tg=−28° C.);
  coumarone/indene resins: by Rutgers Chemicals under the name Novares C30 (Mn=295 g/mol; Mw=378 g/mol; PI=1.28; SP=25° C.; Tg=−19° C.);
  $C_9$ fraction resins: by Rutgers Chemicals under the name Novares TT30 (Mn=329 g/mol; Mw=434 g/mol; PI=1.32; SP=25° C.; Tg=−12° C.).

When a plasticizing resin viscous at 20° C. is used, its content in the composition of the tread according to the invention can be within a range extending from 5 to 110 phr, preferably from 30 to 90 phr.

Very advantageously, the total content of liquid plasticizer at 23° C. and of plasticizing resin viscous at 20° C. is within a range extending from 5 to 110 phr, preferably from 10 to 100 phr, preferably from 15 to 90 phr.

II-3.4 Tg of the Composition

A person skilled in the art knows how to adapt the Tg of the rubber composition by adjusting the content of the plasticizing system.

Particularly advantageously, the plasticizing system is present in an amount such that the glass transition temperature (Tg) of the composition is within a range extending from −45° C. to 0° C., preferably from −25° C. to −5° C.

The glass transition temperature Tg of the compositions according to the invention is determined on a viscosity analyser (Metravib VA4000), according to Standard ASTM D5992-96. The dynamic properties are measured on a cross-linked composition sample, that is to say a composition sample cured to a degree of conversion of at least 90%, the sample having the form of a cylindrical test specimen having a thickness equal to 2 mm and a cross-section equal to 78.5 mm². The response of the sample of elastomeric mixture to a simple alternating sinusoidal shear stress, having a peak-to-peak amplitude equal to 0.7 MPa and a frequency equal to 10 Hz, is recorded. A temperature sweep is carried out at a constant rate of rise in temperature of +1.5° C./min. The results made use of are generally the complex dynamic shear modulus G*, comprising an elastic part G' and a viscous part G", and the dynamic loss tan δ, equal to the ratio G"/G'. The glass transition temperature Tg is the temperature at which the dynamic loss tan δ reaches a maximum during the temperature sweep.

II-4 Crosslinking System

II-4-1 Organic Peroxide

According to the invention, the rubber composition of the tread comprises at least one organic peroxide. The organic peroxide used in the process according to the invention can be any organic peroxide known to a person skilled in the art.

The organic peroxide is preferably selected from the group comprising or consisting of dialkyl peroxides, monoperoxycarbonates, diacyl peroxides, peroxyketals or peroxyesters.

Preferably, the dialkyl peroxides are selected from the group comprising or consisting of dicumyl peroxide, di(t-butyl) peroxide, t-butyl cumyl peroxide, 2,5-dimethyl-2,5-di(t-butylperoxy)hexane, 2,5-dimethyl-2,5-di(t-amylperoxy)hexane, 2,5-dimethyl-2,5-di(t-butylperoxy)hex-3-yne, 2,5-dimethyl-2,5-di(t-amylperoxy)hex-3-yne, α,α'-di[(t-butylperoxy)isopropyl]benzene, α,α'-di[(t-amylperoxy)isopropyl]benzene, di(t-amyl) peroxide, 1,3,5-tri[(t-butylperoxy)isopropyl]benzene, 1,3-dimethyl-3-(t-butylperoxy) butanol and 1,3-dimethyl-3-(t-amylperoxy)butanol.

Some monoperoxycarbonates, such as OO-tert-butyl O-(2-ethylhexyl) monoperoxycarbonate, OO-tert-butyl O-isopropyl monoperoxycarbonate and OO-tert-amyl O-(2-ethylhexyl) monoperoxycarbonate, can also be used.

Among diacyl peroxides, the preferred peroxide is benzoyl peroxide.

Among peroxyketals, the preferred peroxides are selected from the group comprising or consisting of 1,1-di(t-butylperoxy)-3,3,5-trimethylcyclohexane, n-butyl 4,4-di(t-butylperoxy)valerate, ethyl 3,3-di(t-butylperoxy)butyrate, 2,2-di(t-amylperoxy)propane, 3,6,9-triethyl-3,6,9-trimethyl-1,4,7-triperoxynonane (or methyl ethyl ketone peroxide cyclic trimer), 3,3,5,7,7-pentamethyl-1,2,4-trioxepane, n-butyl 4,4-bis(t-amylperoxy)valerate, ethyl 3,3-di(t-amylperoxy) butyrate, 1,1-di(t-butylperoxy)cyclohexane, 1,1-di(t-amylperoxy)cyclohexane and their mixtures. Preferably, the peroxyesters are selected from the group consisting of tert-butyl peroxybenzoate, tert-butyl peroxy-2-ethylhexanoate and tert-butyl peroxy-3,5,5-trimethylhexanoate.

To summarize, the organic peroxide is, particularly preferably, selected from the group consisting of dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis(tert-butylperoxy)-2,5-dimethylhexane, n-butyl 4,4-di(tert-butylperoxy)valerate, OO-(t-butyl)O-(2-ethylhexyl) monoperoxycarbonate, tert-butylperoxy isopropyl carbonate, tert-butyl peroxybenzoate, tert-butyl peroxy-3,5,5-trimethylhexanoate, 1,3(4)-bis(tert-butylperoxyisopropyl)benzene and their mixtures. More preferably, the organic peroxide is selected from the group consisting of from the group consisting of dicumyl peroxide, n-butyl 4,4-di(tert-butylperoxy)valerate, OO-(t-butyl) O-(2-ethylhexyl) monoperoxycarbonate, tert-butylperoxy isopropyl carbonate, tert-butyl peroxybenzoate, tert-butyl peroxy-3,5,5-trimethylhexanoate, 1,3(4)-bis(tert-butylperoxyisopropyl)benzene and their mixtures.

The content of peroxide in the composition can be within a range extending from 0.2 to 10 phr. More preferentially, the amount of peroxide in the composition is within a range extending from 1 to 8, preferably from 0.8 to 8, phr, more preferably from 2 to 6 phr.

II-4-2 Sulfur

Furthermore, the rubber composition according to the invention is advantageously devoid of sulfur as vulcanization agent, or contains less than 0.3 phr and preferably less than 0.1 phr thereof. The sulfur can be molecular sulfur or can originate from a sulfur-donating agent, such as alkylphenol disulfides (APDSs). Very advantageously, the composition of the tread according to the invention is devoid of sulfur as vulcanization agent.

II-4-3 Acrylate Derivative

Furthermore, the rubber composition of the tread according to the invention is advantageously devoid of acrylate derivative of formula (I):

in which:
[X]$_p$ corresponds to a radical of formula (II):
in which:

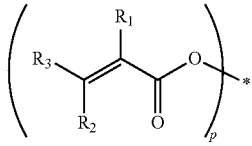

$R_1$, $R_2$ and $R_3$ independently represent a hydrogen atom or a $C_1$-$C_8$ hydrocarbon group selected from the group consisting of linear, branched or cyclic alkyl groups, alkylaryl groups, aryl groups and aralkyls, and which are optionally interrupted by one or more heteroatoms, it being possible for $R_2$ and $R_3$ together to form a non-aromatic ring, (*) represents the point of attachment of the radical of formula (II) to A, A represents an atom belonging to the group consisting of alkaline earth metals and transition metals, a carbon atom or a $C_1$-$C_8$ hydrocarbon group, A comprising p free valencies, p having a value ranging from 2 to 4, it being understood that the 2 to 4 X radicals are identical or different, or contains less than 1 phr, preferably less than 0.8 phr, thereof. Very advantageously, the composition of the tread according to the invention is devoid of the acrylate derivative of formula (I) above.

II-5 Various Additives

The rubber composition of the tread of the tyre according to the invention can also comprise all or part of the usual additives generally used in elastomer compositions for tyres, such as, for example, reinforcing resins, fillers other than those mentioned above, pigments, protective agents, such as antiozone waxes, chemical antiozonants or antioxidants, or anti-fatigue agents, well known to a person skilled in the art.

II-6 Preparation of the Rubber Compositions

The rubber composition of the tread according to the invention can be manufactured in appropriate mixers using two successive preparation phases well known to a person skilled in the art:

- a first phase of thermomechanical working or kneading ("non-productive" phase), which can be carried out in a single thermomechanical stage during which all the necessary constituents, in particular the elastomeric matrix, the silica and the optional other various additives, with the exception of the peroxide, are introduced into an appropriate mixer, such as a standard internal mixer (for example of 'Banbury' type). The incorporation of the filler in the elastomer, when it is present, can be carried out in one or more goes by thermomechanically kneading. The non-productive phase is carried out at high temperature, up to a maximum temperature of between 110° C. and 200° C., preferably between 130° C. and 185° C., for a period of time generally of between 2 and 10 minutes.
- a second phase of mechanical working ("productive" phase), which is carried out in an external mixer, such as an open mill, after cooling the mixture obtained during the first non-productive phase down to a lower temperature, typically of less than 120° C., for example between 40° C. and 100° C. The peroxide is then incorporated and the combined mixture is then mixed for a few minutes, for example between 2 and 15 min.

The final composition thus obtained is subsequently calendered, for example in the form of a sheet or of a plaque, in particular for a laboratory characterization, or also extruded in the form of a rubber semi-finished (or profiled) element which can be used, for example, as a tyre tread or as tyre internal layer.

The curing can be carried out, in a way known to a person skilled in the art, at a temperature generally of between 130° C. and 200° C., under pressure, for a sufficient time which can vary, for example, between 5 and 90 min as a function in particular of the curing temperature, of the crosslinking system adopted, of the kinetics of crosslinking of the composition under consideration or also of the size of the tyre.

II-7 Tread and Tyre

In a known way, the tread of a tyre, whether it is intended to equip a passenger vehicle or other vehicle, comprises a rolling surface intended to be in contact with the ground when the tyre is rolling. The tread is provided with a tread pattern comprising in particular tread pattern elements or elementary blocks delimited by various main grooves, which are longitudinal or circumferential, transverse or even oblique, it being possible for the elementary blocks in addition to comprise various incisions or thinner strips. The grooves form channels intended to discharge water during running on wet ground and the walls of these grooves define the leading and trailing edges of the tread pattern elements, depending on the direction of the bend.

Another subject-matter of the present invention is a tyre provided with a tread according to the invention.

The invention relates particularly to tyres intended to equip motor vehicles of passenger and SUV ("Sport Utility Vehicles") type.

The invention relates to the tyres and semi-finished products for tyres described above, articles made of rubber, both in the raw state (that is to say, before curing) and in the cured state (that is to say, after crosslinking or vulcanization).

III— EXAMPLES

III-1 Measurements and Tests Used

Dynamic Properties:

The dynamic properties $G^*$ and $\tan(\delta)$Max are measured on a viscosity analyser (Metravib VA4000) according to Standard ASTM D5992-96. The response of a sample of vulcanized composition (cylindrical test specimen with a thickness of 2 mm and a cross-section of 79 mm$^2$), subjected to a simple alternating sinusoidal shear stress, at a frequency of 10 Hz, under standard temperature conditions (23° C.), at 0° C. or at 100° C. according to Standard ASTM D1349-09 for the measurements of $\tan(\delta)$Max, or else at −10° C. for the measurements of $G^*$, is recorded. A strain amplitude sweep is carried out from 0.1% to 50% (outward cycle) and then from 50% to 0.1% (return cycle).

The results made use of are the loss factors $\tan(\delta)$ at 0° C. and 100° C. On the return cycle, the loss factor, denoted $\tan(\delta)$Max, is recorded.

The results for $\tan(\delta)$Max at 0° C. are expressed in base 100, the value 100 being assigned to the control. A result of greater than 100 indicates an improved performance, that is to say that the composition of the example under consideration reflects a better wet grip of the tread comprising such a composition.

The results for $\tan(\delta)$Max at 100° C. are expressed in base 100, the value 100 being assigned to the control. A result of greater than 100 indicates an improved performance, that is to say that the composition of the example under consideration reflects a better dry grip of the tread comprising such a composition.

Tensile Tests:

These tensile tests make it possible to determine the elasticity moduli and the properties at break and are based on French Standard NF T 46-002 of September 1988.

Processing the tensile recordings also makes it possible to plot the curve of modulus as a function of the elongation, the modulus used here being the nominal (or apparent) secant modulus measured in first elongation, calculated by reducing to the initial cross section of the test specimen. The nominal secant moduli (or apparent stresses, in MPa) are measured in first elongation at 100° C.±2° C. at 10%, 100% and 300% elongation, denoted MSA10, MSA100 and MSA300 respectively.

The results of MSA300 at 100° C. are expressed as base 100, the value 100 being attributed to the control. A result greater than 100 indicates an improved performance, i.e. the composition of the example under consideration shows a resistance to severe wear of the tread comprising such a composition.

III-2 Preparation of the Compositions

In the examples which follow, the rubber compositions were produced as described in point II-6 above. In particular, the "non-productive" phase was carried out in a 0.4 litre mixer for 3.5 minutes, for a mean blade speed of 50 revolutions per minute, until a maximum dropping temperature of 160° C. was reached. The "productive" phase was carried out in an open mill at 23° C. for 5 minutes.

III-3 Tests on Rubber Compositions

The object of the examples presented below is to compare the resistance to severe wear and the dry and wet grip of a composition in accordance with the present invention (I1) with a control composition (C1) of the prior art which differs from I1 only in the contents of carbon black and of silica as reinforcing filler (the content of coupling agent used is maintained at a content of 8% by weight, with respect to the weight of silica). Other compositions in accordance with the invention (I2, I3, I4, I5) were also tested to determine the effect of different functionalized diene elastomers and another blend of reinforcing filler. The formulations analysed (in phr) and the results obtained are presented in Table 1 below.

TABLE 1

|  | C1 | I1 | I2 | I3 | I4 | I5 |
|---|---|---|---|---|---|---|
| SBR 1 (a) | 100 | 100 | — | 85 | 50 | 100 |
| SBR 2 (b) | — | — | 57 | — | — | — |
| SBR 3 (c) | — | — | — | — | 50 | — |
| BR (d) | — | — | 43 | — | — | — |
| Natural rubber | — | — | — | 15 | — | — |
| Silica (e) | 60 | 30 | 30 | 30 | 30 | 15 |
| Carbon black (f) | 50 | 80 | 80 | 80 | 80 | 95 |
| Plasticizing resin (g) | 70 | 70 | 70 | 70 | 70 | 70 |
| Peroxide (h) | 4 | 4 | 4 | 4 | 4 | 4 |
| Antioxidant (i) | 3.5 | 3.5 | 3.5 | 3.5 | 3.5 | 3.5 |
| TMQ (j) | 1.5 | 1.5 | 1.5 | 1.5 | 1.5 | 1.5 |
| Antiozone wax (k) | 2.5 | 2.5 | 2.5 | 2.5 | 2.5 | 2.5 |
| Coupling agent (l) | 4.8 | 2.4 | 2.4 | 2.4 | 2.4 | 1.2 |
| DPG (m) | 3.5 | 3.5 | 3.5 | 3.5 | 3.5 | 3.5 |
| Stearic acid (n) | 3 | 3 | 3 | 3 | 3 | 3 |
| ZnO (o) | 1.2 | 1.2 | 1.2 | 1.2 | 1.2 | 1.2 |
| tan(δ)Max 100° C. | 100 | 131 | 167 | 139 | 141 | 149 |
| tan(δ)Max 0° C. | 100 | 108 | 128 | 118 | 162 | 112 |

(a) SBR 1: SBR with 3% of styrene units and 13% of 1,2-units of the butadiene part bearing an amino-alkoxysilane functional group in the middle of the elastomer chain (Tg −88° C.)
(b) SBR 2: SBR (Sn star-branched) with 26% of styrene units and 24% of 1,2-units of the butadiene part bearing a silanol functional group at the end of the elastomer chain (Tg −65° C.)
(c) SBR 3: SBR with 24.5% of styrene units and 24% of 1,2-units of the butadiene part bearing an aminoalkoxysilane functional group in the middle of the elastomer chain (Tg −48° C.)
(d) BR: Polybutadiene with 0.5% of 1,2-units and 97% of 1,4-cis (Tg = −108° C.)
(e) Zeosil 1165 MP silica from Rhodia, HDS type
(f) ASTM N234 grade (Cabot)
(g) C5/C9 resin (ECR-373 resin from ExxonMobil)
(h) 1,3(4)-Bis(tert-butylperoxyisopropyl)benzene (Luperox F40MG from Arkema)
(i) N-(1,3-Dimethylbutyl)-N'-phenyl-para-phenylenediamine (Santoflex 6-PPD from Flexsys)
(j) 2,2,4-trimethyl-1,2-dihydroquinoline (TMQ from Lanxess)
(k) Antiozone wax (Varazon 4959 from Sasol Wax)
(l) TESPT (Si69 from Degussa)
(m) Diphenylguanidine (Perkacit DPG from Flexsys)
(n) Stearin (Pristerene 4931 from Uniqema)
(o) Zinc oxide (industrial grade-Umicore)

These results show that the combined use of carbon black and of silica as reinforcing filler at contents in accordance with the present invention, in compositions comprising predominantly at least one polybutadiene-based elastomer, modified with a functional group capable of interacting with silica as reinforcing filler and a peroxide crosslinking system, makes it possible to simultaneously improve the dry and wet grip.

Some of the compositions above were also tested for their properties of resistance to wear in severe conditions. These compositions were compared with the control composition C1, and with other control compositions C2 and C3, the reinforcing fillers of which are not in accordance with the present invention. The formulations analysed (in phr) and the results obtained are presented in Table 2 below.

TABLE 2

|  | C1 | I1 | I5 | C2 | C3 |
|---|---|---|---|---|---|
| SBR 1 (a) | 100 | 100 | 100 | 100 | 100 |
| SBR 2 (b) | — | — | — | — | — |
| SBR 3 (c) | — | — | — | — | — |
| BR (d) | — | — | — | — | — |
| Natural rubber | — | — | — | — | — |
| Silica (e) | 60 | 30 | 15 | 110 | — |
| Carbon black (f) | 50 | 80 | 95 | 5 | 110 |
| Plasticizing resin (g) | 70 | 70 | 70 | 90 | 70 |
| Peroxide (h) | 4 | 4 | 4 | 4 | 4 |
| Antioxidant (i) | 3.5 | 3.5 | 3.5 | 3.5 | 3.5 |
| TMQ (j) | 1.5 | 1.5 | 1.5 | 1.5 | 1.5 |
| Antiozone wax (k) | 2.5 | 2.5 | 2.5 | 2.5 | 2.5 |
| Coupling agent (l) | 4.8 | 2.4 | 1.2 | 8.8 | — |
| DPG (m) | 3.5 | 3.5 | 3.5 | 3.5 | 3.5 |
| Stearic acid (n) | 3 | 3 | 3 | 3 | 3 |
| ZnO (o) | 1.2 | 1.2 | 1.2 | 1.2 | 1.2 |
| MSA300 at 100° C. | 100 | 108 | 103 | 88 | 75 |

(a) to (o) see Table 1

These results show that the combined use of carbon black and of silica as reinforcing filler at contents in accordance with the present invention, also makes it possible to improve the resistance to wear in severe conditions.

The invention claimed is:

1. A tire tread comprising a rubber composition based on at least:
   100 phr of a diene elastomer, the diene elastomer being a styrene/butadiene copolymer having a styrene content between 1% and 4% relative to a total weight of the styrene/butadiene copolymer and exhibiting a glass transition temperature of between −100° C. and −80° C., modified with a functional group capable of interacting with silica as a reinforcing filler;
   the reinforcing filler comprising at least 20 phr of carbon black and from more than 0 to less than 40 phr of silica;
   a coupling agent;
   a plasticizing system comprising a plasticizing resin exhibiting a glass transition temperature of greater than 20° C.; and
   a crosslinking system based on organic peroxide,
   wherein the diene elastomer comprises an alkoxysilane group bearing at least one primary, secondary or tertiary amine functional group, and
   wherein the alkoxysilane group bearing the primary, secondary or tertiary amine functional group corresponds to Formula (II) or Formula (III):

Formula (II)

$$E\!-\!\underset{\underset{\underset{R_5}{\|}}{N}}{\overset{R_1}{\underset{|}{Si}}}\!-\!R_6$$
$$\phantom{E-Si}R_2$$

Formula (III)

$$E\!-\!\underset{\underset{A}{\underset{\|}{A}}}{\overset{R_1}{\underset{|}{Si}}}\!-\!R_6$$

in which:
   E is the diene elastomer;
   $R_1$ and $R_6$, which are identical or different, are the diene elastomer or an oxygen atom substituted by a hydrogen atom or a linear or branched $C_{1-10}$ alkyl, $C_{5-18}$ cycloalkyl, $C_{6-18}$ aryl or $C_{7-18}$ aralkyl radical;

$R_2$ is a linear or branched divalent $C_{1-10}$ alkyl, $C_{6-18}$ aryl or $C_{7-18}$ aralkyl hydrocarbon radical;

$R_5$ is a linear or branched $C_{1-10}$ alkylidene radical; and each A, independently of one another, is a nitrogen atom or a carbon atom, provided that at least one A is a nitrogen atom.

2. The tire tread according to claim 1, wherein the functional group capable of interacting with silica as the reinforcing filler of the diene elastomer is at least one alkoxysilane group bonded to the diene elastomer by a silicon atom of the at least one alkoxysilane group.

3. The tire tread according to claim 2, wherein the alkoxysilane group of the diene elastomer is positioned inside the elastomer chain of the diene elastomer.

4. The tire tread according to claim 1, wherein the primary, secondary or tertiary amine functional group is borne, directly or via a spacer group, by the silicon atom of the at least one alkoxysilane group of the diene elastomer.

5. The tire tread according to claim 1, wherein $R_1$ is an oxygen atom substituted by a methyl or ethyl radical;

$R_2$ represents the ethane-1,2-diyl or propane-1,3-diyl radical;

$R_5$ is a linear or branched $C_{4-6}$ alkylidene radical;

only one A is a nitrogen atom and is located in the meta or para position of the ring with respect to —$R_2$; and $R_6$ is the diene elastomer.

6. The tire tread according to claim 1, wherein the content of carbon black in the composition is between 20 and 200 phr.

7. The tire tread according to claim 1, wherein the content of silica as reinforcing filler in the composition is between 0 and 39 phr.

8. The tire tread according to claim 1, wherein the plasticizing resin exhibiting a glass transition temperature of greater than 20° C. is selected from the group consisting of cyclopentadiene homopolymer or copolymer resins, dicyclopentadiene homopolymer or copolymer resins, terpene homopolymer or copolymer resins, $C_5$ fraction homopolymer or copolymer resins, $C_9$ fraction homopolymer or copolymer resins, α-methylstyrene homopolymer or copolymer resins, and mixtures thereof.

9. The tire tread according to claim 1, wherein a content of plasticizing resin exhibiting a glass transition temperature of greater than 20° C. in the composition is within a range extending from 15 to 200 phr.

10. The tire tread according to claim 1, wherein the plasticizing system further comprises from 0 to 110 phr of plasticizer liquid at 23° C.

11. The tire tread according to claim 10, wherein a content of plasticizer liquid at 23° C. in the composition is within a range extending from 5 to 110 phr.

12. The tire tread according to claim 10, wherein the plasticizer liquid at 23° C. is selected from the group consisting of liquid diene polymers, polyolefin oils, naphthenic oils, paraffinic oils, DAE oils, MES oils, TDAE oils, RAE oils, TRAE oils, SRAE oils, mineral oils, vegetable oils, ether plasticizers, ester plasticizers, phosphate plasticizers, sulfonate plasticizers and mixtures thereof.

13. The tire tread according to claim 1, wherein the organic peroxide is selected from the group consisting of dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis(tert-butylperoxy)-2,5-dimethylhexane, n-butyl 4,4-di(tert-butylperoxy) valerate, OO-(t-butyl) O-(2-ethylhexyl) monoperoxycarbonate, tert-butylperoxy isopropyl carbonate, tert-butyl peroxybenzoate, tert-butyl peroxy-3,5,5-trimethylhexanoate, 1,3(4)-bis(tert-butylperoxyisopropyl)benzene and mixtures thereof.

14. The tire tread according to claim 1, wherein a content of organic peroxide in the composition is within a range extending from 0.8 to 8 phr.

15. A tire provided with a tire tread according to claim 1.

* * * * *